(12) United States Patent
Ikenishi et al.

(10) Patent No.: US 7,595,273 B2
(45) Date of Patent: Sep. 29, 2009

(54) GLASS SUBSTRATE FOR INFORMATION RECORDING MEDIUM, PROCESS FOR PRODUCING THE GLASS SUBSTRATE, INFORMATION RECORDING MEDIUM, AND PROCESS FOR PRODUCING THE SAME

(75) Inventors: Mikio Ikenishi, Akishima (JP); Xuelu Zou, Akishima (JP)

(73) Assignee: Hoya Corporation, Tokyo (JP)

( * ) Notice: Subject to any disclaimer, the term of this patent is extended or adjusted under 35 U.S.C. 154(b) by 638 days.

(21) Appl. No.: 11/111,987

(22) Filed: Apr. 22, 2005

(65) Prior Publication Data

US 2005/0244656 A1 Nov. 3, 2005

(30) Foreign Application Priority Data

Apr. 28, 2004 (JP) ............................. 2004-133592

(51) Int. Cl.
*C03C 3/087* (2006.01)
(52) U.S. Cl. ........................................................ 501/70
(58) Field of Classification Search .................... 501/70
See application file for complete search history.

(56) References Cited

U.S. PATENT DOCUMENTS

| | | | | |
|---|---|---|---|---|
| 6,162,750 | A * | 12/2000 | Miwa et al. | 501/69 |
| 6,297,182 | B1 * | 10/2001 | Maeda et al. | 501/66 |
| 6,387,510 | B1 * | 5/2002 | Nakashima et al. | 428/426 |
| 6,713,418 | B2 * | 3/2004 | Kishimoto et al. | 501/70 |
| 2005/0117438 | A1 * | 6/2005 | Ikenishi et al. | 365/232 |

FOREIGN PATENT DOCUMENTS

| | | |
|---|---|---|
| CN | 1290665 A | 4/2001 |
| JP | 8-290938 | 11/1996 |
| JP | 2000-203874 | 7/2000 |
| JP | 2000-357318 | 12/2000 |
| JP | 2001-172043 | 6/2001 |
| JP | 2002-167230 | 6/2002 |
| JP | 2002-237030 | 8/2002 |
| JP | 2002-348141 | 12/2002 |
| JP | 3412804 B | 3/2003 |
| WO | WO 03/102928 A1 | 12/2003 |

\* cited by examiner

*Primary Examiner*—Karl E Group
*Assistant Examiner*—Elizabeth A Bolden
(74) *Attorney, Agent, or Firm*—Nixon & Vanderhye P.C.

(57) ABSTRACT

A glass substrate for an information recording medium, which has high heat resistance, has such high thermal shock resistance that it does not break when exposed to a sharp change in temperature and has high strength against scratching, and which is formed of a glass comprising $SiO_2$, $Al_2O_3$, $ZrO_2$, CaO, BaO, $Li_2O$ and $Na_2O$ as essential components and comprises, by mole %, 50 to 70% of $SiO_2$, 1 to 10% of $Al_2O_3$, over 0% but not more than 12% of $ZrO_2$, 2 to 24% of CaO, over 0% but not more than 15% of BaO, 0 to 10% of MgO, 0 to 15% of SrO, provided that the content of CaO+BaO+MgO+SrO is over 10% but less than 25%, over 0% but not more than 6% of $Li_2O$, over 0% but not more than 10% of $Na_2O$, 0 to 5% of $K_2O$, and 0 to 10% of $TiO_2$.

8 Claims, No Drawings

GLASS SUBSTRATE FOR INFORMATION RECORDING MEDIUM, PROCESS FOR PRODUCING THE GLASS SUBSTRATE, INFORMATION RECORDING MEDIUM, AND PROCESS FOR PRODUCING THE SAME

TECHNICAL FIELD

The present invention relates to a glass substrate for an information recording medium such as a hard disk or a magnetic recording type hard disk in particular, a process for producing the glass substrate, an information recording medium using the glass substrate and a process for producing the information recording medium.

TECHNICAL BACKGROUND

Aluminum and glass are now mainstream materials as substrate materials for information recording media such as a hard disk, and the like. As a glass substrate, a chemically strengthened glass is used as described in Japanese Patent No. 3412804, and an information recording medium using such a chemically strengthened glass is imparted with full reliability.

Meanwhile, in recent years, in the production of an information recording medium such as the above hard disk, it has come to be necessary to heat-treat a substrate at a high temperature for imparting a film formed on the substrate with novel properties, for example, for obtaining a film structure of a perpendicular magnetic recording mode. Aluminum as a typical substrate material has a problem that when exposed to a high temperature, an aluminum substrate is deformed and impaired in flatness that a hard disk is required to have, so that aluminum is not suitable for the above use. On the other hand, a glass substrate is also required to have high heat durability (high glass transition temperature) so that it can maintain sufficient flatness even when treated at high temperatures.

However, even if a glass constituting a glass substrate is improved in heat durability alone, the glass substrate may break due to a thermal shock when exposed to a sharp change in temperature.

That is, even a glass substrate formed of a glass having a high glass transition temperature sometimes undergoes a breaking when rapidly cooled close to room temperature from a state where it is heated at a high temperature.

As a glass substrate, further, there is demanded a highly reliable substrate that has high strength against scratching and that does not break in a production step.

DISCLOSURE OF THE INVENTION

For overcoming the above problems, the present invention aims at providing a glass substrate for an information recording medium which glass substrate has high heat durability and such high thermal shock resistance that it does not break even when exposed to a sharp change in temperature and which glass substrate has high strength against scratching, a process for producing the glass substrate, an information recording medium having the above glass substrate such as a magnetic disk or the like, and a process for the production of the magnetic recording medium.

For achieving the above object, the present inventors have made diligent studies. As a result, it has been surprisingly found that a glass substrate containing a small amount of $Li_2O$ and having a specific glass composition can achieve the above object, and the present invention has been accordingly completed on the basis of the above finding.

That is, present invention provides (1) a glass substrate for an information recording medium, which is formed of a glass comprising $SiO_2$, $Al_2O_3$, $ZrO_2$, CaO, BaO, $Li_2O$ and $Na_2O$ as essential components and comprising, by mol %, 50 to 70% of $SiO_2$,
1 to 10% of $Al_2O_3$,
over 0% but not more than 12% of $ZrO_2$,
2 to 24% of CaO,
over 0% but not more than 15% of BaO,
0 to 10% of MgO,
0 to 15% of SrO, provided that the content of CaO+BaO+MgO+SrO is over 10% but less than 25%, over 0% but not more than 6% of $Li_2O$,
over 0% but not more than 10% of $Na_2O$,
0 to 5% of $K_2O$, and
0 to 10% of $TiO_2$, (2) a glass substrate for an information recording medium as recited in the above (1), which has such thermal shock resistance that it does not break when rapidly cooled in a manner in which it is introduced into water maintained at 20° C. from a heating state under heat at 170° C. and immersed in the water, (3) a glass substrate for an information recording medium as recited in the above (1), wherein the glass has a glass transition temperature of 560° C. or higher, (4) a glass substrate for an information recording medium as recited in the above (1), wherein the glass has an average linear expansion coefficient of $70 \times 10^{-7}$/K or more at 100 to 300° C., (5) a glass substrate for an information recording medium as recited in the above (1), wherein the glass is a chemically strengthened glass, (6) a glass substrate for an information recording medium as recited in the above (1), which is a substrate for an information perpendicular-recording medium, (7) a process for producing a glass substrate for an information recording medium, which comprises the step of shaping a molten glass into a plate-shaped glass, the molten glass containing $SiO_2$, $Al_2O_3$, $ZrO_2$, CaO, BaO, $Li_2O$ and $Na_2O$ as essential components and comprising, by mol %, 50 to 70% of $SiO_2$,
1 to 10% of $Al_2O_3$,
over 0% but not more than 12% of $ZrO_2$,
2 to 24% of CaO,
over 0% but not more than 15% of BaO,
0 to 10% of MgO,
0 to 15% of SrO, provided that the content of CaO+BaO+MgO+SrO is over 10% but less than 25%, over 0% but not more than 6% of $Li_2O$,
over 0% but not more than 10% of $Na_2O$,
0 to 5% of $K_2O$, and
0 to 10% of $TiO_2$, (8) an information recording medium comprising the glass substrate for an information recording medium recited in the above (1) and at least an information recording layer formed on said glass substrate, and (9) a process for producing an information recording medium, which comprises the step of forming an information recording layer on the glass substrate for an information recording medium recited in the above (1).

Effect of the Invention

According to the present invention, there can be obtained a glass substrate for an information recording medium, which glass substrate has high heat durability and high thermal shock resistance and has high strength against scratching, and the glass substrate makes it possible to produce perpendicular magnetic recording disks, etc., highly productively while maintaining flat and smooth substrate surfaces even at high temperatures without causing any breaking of glass substrates.

PREFERRED EMBODIMENTS OF THE INVENTION

The present invention relates to a glass substrate for an information recording medium, a process for producing the glass substrate, an information recording medium using the glass substrate and a process for producing the information recording medium. These will be consecutively explained hereinafter.

I. Glass Substrate for Information Recording Medium

The glass substrate for an information recording medium, provided by the present invention (to be sometimes referred to as "glass substrate of the present invention" hereinafter), is provided as a glass substrate for an information recording medium including a magnetic recording medium such as a hard disk, a magneto-optical disk and an optical recording medium such as an optical disk.

[Glass Components and Composition]

First, glass components and a glass composition for constituting the glass substrate of the present invention will be explained below. Any content of each component and any total content of a plurality of components expressed by % hereinafter represent a content or a total content by mol % unless otherwise specified.

The glass substrate of the present invention is formed of a glass comprising $SiO_2$, $Al_2O_3$, $ZrO_2$, CaO, BaO, $Li_2O$ and $Na_2O$ as essential components and comprising, by mol %, 50 to 70% of $SiO_2$,
1 to 10% of $Al_2O_3$,
over 0% but not more than 12% of $ZrO_2$,
2 to 24% of CaO,
over 0% but not more than 15% of BaO,
0 to 10% of MgO,
0 to 15% of SrO, provided that the total content of CaO+BaO+MgO+SrO is over 10% but less than 25%, over 0% but not more than 6% of $Li_2O$,
over 0% but not more than 10% of $Na_2O$,
0 to 5% of $K_2O$, and
0 to 10% of $TiO_2$.

$SiO_2$ is a main component for forming a glass network structure and is an essential component that contributes to an improvement in stability of the glass, an increase in glass transition temperature and an improvement in chemical durability. When the content of $SiO_2$ is too small, the glass is impaired in the above properties, so that it is required to introduce 50% or more of $SiO_2$, and it is preferred to introduce 60% or more of $SiO_2$. When the content of $SiO_2$ is too large, the glass is degraded in Young's modulus and meltability, so that the content of $SiO_2$ is limited to 70% or less, preferably, to 67% or less.

$Al_2O_3$ is an essential component that contributes to an increase in glass transition temperature, an improvement in durability, stabilization of a glass structure and an improvement in rigidity. Further, it works to inhibit the elution of an alkali from the glass. For producing the above effects, $Al_2O_3$ is introduced so that the content thereof is 1% or more, preferably, 3% or more. When $Al_2O_3$ is introduced to excess, the glass is degraded in meltability, so that the content of $Al_2O_3$ is limited to 10% or less, preferably, to 7% or less.

$ZrO_2$ is an essential component that improves the glass in chemical durability, rigidity and Young's modulus. For producing the above effects, $ZrO_2$ is introduced so that the content thereof is more than 0%, preferably, 1% or more, more preferably, 2% or more. When $ZrO_2$ is introduced to excess, the specific gravity of the glass increases, and the glass is degraded in meltability, so that the content of $ZrO_2$ is limited to 12% or less, preferably, to 10% or less.

CaO is an essential component that contributes to an improvement in meltability and improvements in thermal expansion coefficient and Young's modulus. For producing the above effects, CaO is introduced so that the content thereof is 2% or more, preferably, 10% or more. When CaO is introduced to excess, however, the glass is degraded in stability, so that the content of CaO is limited to 24% or less, preferably, to 20% or less.

BaO is an essential component that contributes to improvements in thermal expansion coefficient and durability. For producing the above effects, BaO is introduced so that the content thereof is more than 0%, preferably, 1% or more, more preferably 2% or more. When BaO is introduced to excess, however, the glass is degraded in durability, and the specific gravity of the glass is increased, so that the content thereof is limited to 15% or less, preferably, to 10% or less.

MgO and SrO are both optional components that contribute to an increase in thermal expansion coefficient and Young's modulus. When they are introduced to excess, the glass is degraded in durability and stability, so that the content of MgO is limited to 0 to 10%, preferably, to 0 to 3.5%, and that the content of SrO is limited to 0 to 15%, preferably, to 0 to 10%.

Alkaline earth metal oxides including CaO and BaO work to contribute to an improvement in glass meltability and an increase in thermal expansion coefficient as well as alkali metal oxides. However, it is difficult to decrease the glass transition temperature as compared with alkali metal oxides. Therefore, the total content of the alkaline earth metal oxides including MgO and SrO as optional components, i.e., the total content of CaO, BaO, MgO and SrO is adjusted to more than 10%, preferably, to 13% or more, more preferably, to 15% or more. When they are introduced to excess, the glass may be fragile, or the chemical strengthening effect is decreased when the glass is chemically strengthened, so that the above total content is limited to less than 25%, preferably, to 20% or less, more preferably, to 18% or less.

Of the above alkaline earth metal oxides, CaO and BaO alone are essential components, and MgO and SrO are optional components. The reason therefor is as follows. Of the alkaline earth metal oxides, CaO does not increase the specific gravity of the glass, nor does it degrade the water resistance of the glass. And yet CaO improves the glass in devitrification resistance and also strongly works to improve the glass in meltability. BaO increases the glass transition temperature and most strongly works to increase the thermal expansion coefficient of the glass. While MgO is more advantageous than CaO with respect to a decrease in specific gravity, MgO strongly works to decrease the thermal expansion coefficient as compared with any other alkaline earth metal oxide, so that CaO is more positively used than MgO. For the above reason, the molar ratio of the content of CaO to the total content of the alkaline earth metal oxides, CaO/(CaO+BaO+

MgO+SrO), is preferably adjusted to at least 0.5, more preferably, to at least 0.55, still more preferably, to at least 0.6. Similarly, the ratio of the content of BaO to the total content of the alkaline earth metal oxides by molar ratio, BaO/(CaO+ BaO+MgO+SrO), is preferably adjusted to at least 0.15, more preferably, to at least 0.16, still more preferably, to at least 0.17.

$Li_2O$ is a component that contributes to an improvement in meltability of the glass and an increase in thermal expansion coefficient and that also supplies Li ion to be used for ion-exchange for chemically strengthening a glass substrate and hence contributes an improvement in efficiency of the chemical strengthening. It is also important to emphasize that $Li_2O$ is a component that improves the glass in thermal shock resistance.

Generally, $Li_2O$ is a component that decreases the glass transition temperature. Therefore, when it is intended to attain only an improvement in heat resistance and an increase in thermal expansion coefficient for a glass constituting a glass substrate for an information recording medium, it is not so advantageous to introduce $Li_2O$, and when $Li_2O$ is introduced to excess, the glass is decreased in heat resistance to a great extent, so that it is considered undesirable to introduce $Li_2O$. Surprisingly, however, the present inventors have found that a glass containing a small amount of $Li_2O$ has remarkably high thermal shock resistance as compared with a glass containing no $Li_2O$, and have accordingly arrived at completion of the present invention.

For obtaining the above effect, $Li_2O$ is introduced so that the content thereof is more than 0%, preferably, at least 0.5%, more preferably, at least 1%. When $Li_2O$ is introduced to excess, the glass transition temperature is greatly decreased, and the glass is impaired in heat resistance, so that the content thereof is limited to 6% or less, preferably, to 4% or less.

$Na_2O$ is an essential component that effectively improves the glass in meltability and increases the thermal expansion coefficient, and it is also a component that supplies Na ion to be used for ion-exchange for chemical strengthening. For producing the above effects, $Na_2O$ is introduced so that the content thereof is more than 0%, preferably, at least 3%, more preferably, at least 5%. When $Na_2O$ is introduced to excess, there are caused problems that the glass transition temperature is decreased, that the chemical durability is degraded and that an alkali is eluted from a substrate surface. The content of $Na_2O$ is therefore limited to 10% or less, more preferably, to 8% or less.

$K_2O$ is an optional component that improves the glass in meltability and increases the thermal expansion coefficient while maintaining the glass transition temperature at a high level. When $K_2O$ is introduced to excess, however, the glass becomes fragile or the glass transition temperature is decreased. Further, when a glass substrate is chemically strengthened, ion-exchange with Na ion takes place, and the glass substrate is not improved in strength after the chemical strengthening. The content of $K_2O$ is therefore limited to 0 to 5%, preferably, to less than 3.5%, more preferably, to 0 to 2%.

$TiO_2$ is an optional component that effectively improves the glass in chemical durability, rigidity and Young's modulus. When $TiO_2$ is introduced to excess, however, the glass is degraded in devitrification resistance and water resistance, and the specific gravity of the glass is increased. The content of $TiO_2$ is therefore limited to 0 to 10%, preferably, to 0 to 3%. When priority is given to the prevention of a decrease in water resistance, it is desirable to introduce no $TiO_2$.

In the glass substrate of the present invention, $B_2O_3$ and ZnO may be added in addition to the above components. Since, however, $B_2O_3$ works to degrade the glass in water resistance, acid resistance and heat resistance, and ZnO also works to degrade the glass in heat resistance when introduced to excess, so that it is not necessary to take risks by the introduction thereof.

Further, rare earth oxides may be introduced for improving the glass in heat resistance, durability and elastic modulus. The total content of the rare earth oxides is adjusted to 0 to 5%, more preferably, to 0 to 3%. Since, however, the rare earth metal oxides increase the specific gravity of the glass and are expensive, it is not necessary to venture to introduce any one of them. Examples of the above rare earth oxides include $Y_2O_3$, $La_2O_3$, $Gd_2O_3$, $Yb_2O_3$, $Pr_2O_3$, $Sc_2O_3$, $Sm_2O_3$, $Tb_2O_3$, $Dy_2O_3$, $Nd_2O_3$, $Eu_2O_3$, $Ho_2O_3$, $Er_2O_3$, $Tm_2O_3$ and $Lu_2O_3$. When a rare earth oxide is introduced, it is preferred to introduce $Y_2O_3$, since an increase in the specific gravity of the glass is relatively small and since the Young's modulus is highly effectively increased.

A refining agent may be added to the above glass components for well deforming. Examples of the refining agent include $Sb_2O_3$, $As_2O_3$, a fluoride, a chloride, $SO_3$, $CeO_2$, $SnO_2$, $H_2O$, and the like. Of these, $Sb_2O_3$ and $As_2O_3$ have highest refining effects, and it is preferred to add $Sb_2O_3$ and/or $As_2O_3$ when it is intended to obtain an intensive refining effect. In this case, it is desirable to adjust the total amount of $Sb_2O_3$ and $As_2O_3$ to 1% by weight or less per 100% of the glass composition including $Sb_2O_3$ and $As_2O_3$. When a glass substrate is produced, a substrate blank is prepared and then subjected to mechanical processing such as polishing. In the mechanical processing, sludge occurs, and a glass powder is included in a polishing waste liquid. From the viewpoint of prevention of harmful waste, it is preferred to obviate the use of $As_2O_3$.

When weight is given to the refining effect, it is preferred to add $Sb_2O_3$ such that the content thereof per 100% of the glass composition is 0 to 1% by weight, more preferably 0.1 to 1% by weight. $Sb_2O_3$ is suitably used in a method of press-molding a molten glass to produce a substrate blank which method will be described later.

When a substrate blank is produced by a floating method to be described later, it is imperative to obviate the use of $Sb_2O_3$ and $As_2O_3$ which have high oxidizing properties. In this case, a fluoride, a chloride, $SO_3$, $CeO_2$, $SnO_2$, $H_2O$, etc., may be used as a refining agent. However, a fluoride and a chloride have high volatility and are hence not much suitable for obtaining a homogeneous glass. Further, $SO_3$ is not environmentally desirable, either. It is therefore not necessary to take risks by adding a fluoride, a chloride or $SO_3$.

In the glass composition for the glass substrate of the present invention, preferably, the total content of $SiO_2$, $Al_2O_3$, $ZrO_2$, MgO, CaO, SrO, BaO, $Li_2O$, $Na_2O$, $K_2O$ and $TiO_2$ is more than 98%, more preferably, the above total content is 99%, still more preferably, the above total content is 100%. Each of the above compositions may contain 0 to 1% by weight of $Sb_2O_3$ on the basis of the total weight of each composition containing $Sb_2O_3$. When importance is attached to water resistance in each of the above glass compositions, it is preferred to introduce no $TiO_2$, so that $TiO_2$ can be precluded from the above components.

The above glass for constituting the glass substrate of the present invention can be obtained by heating and melting a glass raw material according to a known high-temperature melting method, refining and homogenizing a molten glass and cooling the molten glass.

[Properties of Glass and Glass Substrate]

Properties of the glass for constituting the glass substrate of the present invention and properties of the glass substrate of the present invention will be explained below.

As described above, the glass for constituting the glass substrate of the present invention has the above-specified composition containing $Li_2O$ as an essential component, and the glass substrate for an information recording medium, which glass substrate is formed of the above glass, has high thermal shock resistance. Specifically, the glass (which may be chemically strengthened or may not be chemically strengthened) processed in the form of a substrate has such thermal shock resistance that it does not break when rapidly cooled in a manner in which it is introduced into water maintained at 20° C. from a heating state under heat at 170° C. and immersed in the water.

The amount of the water for use in testing the glass for the above thermal shock resistance can be an amount sufficient for maintaining a water temperature of 20° C. when the hot glass is immersed in the water. From the above viewpoint, the amount of the above water per piece of the glass is preferably 10 liters or more.

The glass substrate of the present invention has high thermal shock resistance. When the glass substrate in a high-temperature state is rapidly cooled, for example, when a gripped portion is rapidly cooled in a manner in which the glass substrate is gripped after carrying out high-temperature sputtering or high-temperature annealing for producing a perpendicular magnetic recording disk, the glass substrate is free from braking caused by thermal shock. After high-temperature sputtering or high-temperature annealing treatment, the glass substrate in a high-temperature state can be handled and processed at a subsequent step without cooling the glass substrate, so that the productivity of the glass substrate can be improved.

The glass constituting the glass substrate of the present invention has high heat resistance, so that the flatness of the glass substrate is not impaired even when the glass substrate is exposed to high temperatures in the process of producing an information recording medium.

The index of the above heat resistance can be quantitatively represented by a glass transition temperature. The glass transition temperature of the glass substrate of the present invention is preferably 560° C. or higher, more preferably 580° C. or higher, still more preferably 600° C. or higher. While the glass transition temperature has no upper limit, a glass transition temperature of 800° C. or lower can be employed as a criterion so that other properties that the glass substrate is required to have are not impaired.

The glass constituting the glass substrate of the present invention preferably has a large thermal expansion coefficient so that its thermal expansion property matches the thermal expansion property of a clamp material used for fixing the central portion of the substrate in an information recording device. Generally, the clamp is made of stainless steel, so that it is preferred to adjust the average linear expansion coefficient of the glass at 100 to 300° C. to $70 \times 10^{-7}$/K or more so that the thermal expansion property of the stainless steel and the counterpart of the glass can be matched. The above average linear expansion coefficient is more preferably in the range of $75 \times 10^{-7}$/K to $120 \times 10^{-7}$/K.

Preferably, the glass substrate of the present invention is chemically strengthened, although the glass substrate of the present invention shall not be limited thereto. When chemically strengthened, the glass substrate is imparted with high strength, so that the breaking of the glass substrate can be more effectively prevented. The method of chemically strengthening the glass substrate will be described later.

Preferably, the glass substrate of the present invention is a material that has high rigidity and that enables stable high-speed rotation of an information recording medium. For this purpose, the specific gravity of the glass substrate of the present invention is preferably 2.4 to 3.0, more preferably 2.4 to 2.9. Further, the Young's modulus thereof is preferably at least 75 GPa, more preferably at least 80 GPa. While the upper limit of the Young's modulus thereof is not critical, a Young's modulus of 100 GPa or less can be employed as a criterion. The rigidity of the glass substrate of the present invention is preferably at least 30 GPa, more preferably 30 to 35 GPa. The Poisson's ratio thereof is preferably 0.22 to 0.25. Further, the specific elastic modulus (=Young's modulus/specific gravity), which is calculated from the above Young's modulus and specific gravity, is preferably at least $26 \times 10^6$ Nm/kg, more preferably, $26 \times 10^6$ to $32 \times 10^6$ Nm/kg.

The glass substrate of the present invention can be used as a substrate for a magnetic recording medium, and can be particularly suitably used as a substrate for a perpendicular magnetic recording medium. That is, in the glass substrate of the present invention, the glass transition temperature of the glass constituting the substrate is sufficiently higher than the temperature employed for heat treatment in the step of production of an information recording medium, so that the glass substrate is not deformed by the heat treatment in the above production step. Further, the glass substrate of the present invention has high thermal shock resistance, so that it can be easily handled during the above production step, and information recording media can be therefore highly productively produced. Therefore, the glass substrate of the present invention can be suitably used for producing a perpendicular magnetic recording medium of which the production requires high-temperature treatment.

II. Process for Producing Glass Substrate for Information Recording Medium

The process for producing the glass substrate of the present invention comprises the step of shaping a molten glass having the above glass composition to obtain a plate-shaped glass.

The method for shaping the molten glass to obtain a plate-shaped glass includes a press-molding method, a floating method and a down-drawing method.

The press-molding method is a method in which a molten glass is pressed in a press mold to obtain a disk-shaped blank (plate-shaped glass) having dimensions including mechanically processible margins in addition to dimensions of a substrate.

The floating method is a method in which a molten glass is caused to float and flow on a floating bath with a molten metal having a larger specific gravity than the glass in it, and an obtained thin-plate-shaped glass is processed in the form of a disk to obtain a disk-shaped blank (plate-shaped glass). In this method, the lower surface of the molten glass is in contact with a molten metal having a completely horizontal surface, and a load is uniformly exerted on the upper surface of the molten glass due to the weight of the glass itself, so that there can be obtained a plate-shaped glass of which the upper and lower surfaces are flat.

The down drawing method is a method in which a molten glass is caused to flow down, for example, along a shaped material having a wedge-shaped cross section, the molten glass is caused to come together in a lower end portion of the shaped material and then extracted, and the thus-obtained sheet-shaped glass is processed in the form of a disk to obtain a disk-shaped blank_(plate-shaped glass).

The disk-shaped blank (plate-shaped glass) obtained by any one of the above three methods is generally finished into a substrate by making a center hole, processing inner and outer circumferential surfaces and grinding and polishing the main surface.

As other method, there is also a method in which a molten glass is cast into a mold to form a columnar glass, the columnar glass is sliced to obtain a thin-plate-shaped glass, followed by making a center hole, processing inner and outer side surfaces and grinding and polishing the main surface to finish a substrate.

In the polishing of the main surface, the main surface is lapped with an abrasive or diamond pellets or polished with cerium oxide, whereby the surface accuracy thereof can be adjusted, for example, to the range of 0.1 to 0.6 nm. After the polishing, the substrate surface is preferably brought into a clean state by washing it with a wash liquid.

The glass substrate obtained by any one of the above methods is preferably chemically strengthened. The chemical strengthening can be carried out according to a known method. The glass substrate is immersed in a molten salt containing Na ion or K ion, to carry out ion-exchange with Li ion or Na ion having a smaller atomic radius in the glass substrate surface, whereby a compressive stress layer is formed in the vicinity of the substrate surface.

As a molten salt containing Na ion or K ion, a molten salt containing sodium nitrate or potassium nitrate is preferred, and a molten salt containing a mixture of sodium nitrate with potassium nitrate is more preferred.

Preferably, the chemically strengthened glass substrate is further washed to make the same clean. The above wash liquid can be properly selected from a solution of an acid or an alkali such as a silicofluoric acid solution or an organic solvent as required.

The thus-obtained glass substrate of the present invention has the form of a disk, and has a hole made in its center for attaching a clamp for rotating the substrate. The glass substrate of the present invention can be applied to various disks having various outer diameters such as disks having nominal diameters of 1 inch, 2.5 inches, and the like.

III. Information Recording Medium and Process for Producing the Same

The information recording medium of the present invention comprises the above glass substrate of the present invention and at least information recording layer formed thereon, and it can be applied to various information recording media such as a magnetic recording medium, a magneto-optical recording medium, an optical recording medium, etc., by selecting the information recording layer as required.

The layer constitution formed on the substrate, and the like, will be explained by referring, as example, to a magnetic disk that is a magnetic recording medium.

The magnetic disk generally has layers such as an undercoat layer, a magnetic layer, a protective layer, a lubricant layer, etc., which are consecutively formed on a glass substrate. While the magnetic layer is not specially limited, preferably, examples thereof include a Co—Cr-containing, Co—Cr—Pt-containing, Co—Ni—Cr-containing, Co—Ni—Pt-containing, Co—Ni—Cr—Pt-containing and Co—Cr—Ta-containing magnetic layers and others. The above "-containing" means that a magnetic layer contains at least substances specified.

As an undercoat layer, an Ni layer, an Ni—P layer, a Cr layer or the like can be used, and as a protective layer, a carbon film, or the like can be used. For the lubricant layer, lubricants such as a perfluoropolyether-containing lubricant, etc., can be used.

The information recording medium of the present invention can be particularly suitably applied to a perpendicular magnetic recording medium. The production of a perpendicular magnetic recording medium requires high-temperature treatment, and the glass constituting the glass substrate for an information recording medium, provided by the present invention, has a sufficiently high glass transition temperature as compared with the temperature employed for the heat treatment in the process of producing the information recording medium, so that the glass substrate is not deformed by the heat treatment. Further, the glass substrate has high thermal shock resistance, so that it can be easily handled during the production step, and information recording media can be highly productively produced.

A perpendicular magnetic recording disk has a high recording density (e.g., 1T Bits/(2.5 cm)$_2$) as compared with the surface recording density (100 GBits/(2.5 cm)$^2$) of any conventional longitudinal magnetic recording medium, so that the perpendicular magnetic recording disk is an information recording medium that can have a far higher recording density.

In the perpendicular magnetic recording disk, the layer constitution formed on the substrate includes a single-layered film in which a perpendicular magnetic recording layer is formed on the glass substrate that is a non-magnetic material, a bi-layered film in which a soft magnetic layer and a magnetic recording layer are consecutively stacked, a three-layered film in which a hard magnetic layer, a soft magnetic layer and a magnetic recording layer are consecutively formed, and the like. Of these, the bi-layered film and the three-layered film are preferred since they are more suitable for attaining a higher recording density and maintaining stability of a magnetic moment than the single-layered film.

The process for producing an information recording medium, provided by the present invention, comprises the step of forming an information recording layer on the above glass substrate of the present invention. Generally, the information recording medium can be produced by consecutively forming an undercoat layer, an information recording layer (magnetic layer), a protective layer, a lubricant layer, etc., on the above glass substrate. Each layer can be formed by a known method such as a sputtering method or the like.

For improving the properties of the above multi-magnetic-layered perpendicular magnetic recording medium, further, a high-temperature treatment (annealing treatment) at 400 to 600° C. can be carried out during the formation of a film in a high-temperature sputtering machine or after the formation of a film.

The glass substrate of the present invention has high heat resistance and high thermal shock resistance and has high strength against scratching, so that the glass substrate can maintain excellent flatness without being deformed by the above high-temperature treatment, and can improve the productivity of information recording media.

EXAMPLES

The present invention will be explained further in detail with reference to Examples hereinafter, while the present invention shall not be limited by these Examples.

Example 1

As starting materials, $SiO_2$, $Al_2O_3$, $Al(OH)_3$, $CaCO_3$, $BaCO_3$, $Li_2CO_3$, $Na_2CO_3$, $K_2CO_3$, $TiO_2$, $ZrO_2$, etc., were used such that a glass having any one of compositions Nos. 1 to 15 shown in Tables 1 to 3 was obtained. A glass raw material containing the above starting materials for the compositions was weighed so as to have a weight of 300 to 1,500 g. These raw materials were fully mixed to obtain a prepared batch, and the batch was placed in a platinum crucible and melted at a temperature of 1,400 to 1,600° C. in air for approximately 3 to 8 hours.

The resultant glass melt was cast into a 40×40×20 mm carbon mold and allowed to cool to a glass transition temperature, and immediately thereafter, the glass was placed in an annealing furnace and held for 1 hour. Then, the glass was allowed to cool to room temperature.

When each of the thus-obtained glasses was observed through a microscope, no crystal particles were observed in any glass. The obtained glasses had high homogeneity, and no non-melt substance was found. It was found that the glasses had high meltability.

Then, each of the above-obtained glasses for substrates was measured for a glass transition temperature, an average linear expansion coefficient at 100 to 300° C., a specific gravity, a Young's modulus, a rigidity and a Poisson's ratio. Further, specific elastic moduli were calculated from the obtained measurement results, Tables 1 to 3 show the above results together with the glass compositions.

Further, glasses were prepared by adding $Sb_2O_3$ to each of the above glass compositions, the amount of $Sb_2O_3$ being 0.5% by weight per 100% of the glass composition, and it was found that the glasses had similar properties. When glasses obtained by adding $Sb_2O_3$ were observed through a microscope, no gas foams were observed. Methods of measurements of the above properties were as follows.

(1) Glass Transition Temperature

A glass was processed in a 5 mmϕ×20 mm form, and the thus-obtained sample was measured with an apparatus for thermomechanical analysis (TMA8140, supplied by Rigaku Corporation) at a temperature elevation rate of +4° C./minute. As a standard sample, $SiO_2$ was used. The glass transition temperature of a glass corresponds to a temperature at which the glass comes to show a viscosity of 1013.3 dPa·s.

(2) Average Linear Expansion Coefficient

A glass was measured for an average linear expansion coefficient at 100° C. to 300° C. when it was measured for a glass transition temperature.

(3) Specific Gravity

A glass was formed in a 40×20×15 mm form and the thus-formed sample was measured by an Archimedean method.

(4) Young's modulus, Rigidity and Poisson's Ratio

A glass was processed in a 40×20×15 mm form, and the thus-obtained sample was measured by an ultrasonic method.

(5) Specific Elastic Modulus

A specific elastic modulus was calculated from the above Young's modulus and specific gravity data according to the equation of specific elastic modulus=Young's modulus/specific gravity.

Each of molten glasses obtained in the same manner as above was fed onto a die and press-molded to form disk-shaped substrate blanks. After the substrate blanks were annealed, a center hole was made through each substrate blank by center-cut processing, and these substrate blanks were subjected to inner and outer circumferential processing, main-surface polishing and lapping to give disk-shaped substrates having an outer diameter of 65.0 mm, a center hole diameter of 20.0 mm and a thickness of 0.635 mm.

For testing the above substrates (not chemically strengthened) for thermal shock resistance, the substrates were heated to 170° C. and poured into, and immersed in, 10 liters of water maintained at a water temperature of 20° C. Although the substrates were rapidly cooled, they were free from breaking.

Then, the same substrates as the above substrates were prepared, and they were immersed in a sodium nitrate/potassium nitrate mixture molten salt under heat at 420° C. for 4 hours to chemically strengthen them.

The glass substrates obtained in this Example are suitable for a magnetic disk having a nominal diameter of 2.5 inches, and as a substrate having high heat resistance and high strength, they are suitable for a perpendicular magnetic recording disk.

Comparative Example 1

Comparative glasses having comparative glass compositions Nos. 1 and 2 shown in Table 3 and containing no $Li_2O$ were obtained in the same manner as in Example 1. Each of the obtained glasses was measured for a glass transition temperature, an average linear expansion coefficient, a specific gravity, a Young's modulus, a rigidity and a Poisson's ratio in the same manner as in Example 1, and specific elastic moduli of these glasses were calculated in the same manner as in Example 1. Table 3 shows the results.

The comparative glasses were shaped into disk-shaped substrates having an outer diameter of 65.0 mm, a center hole diameter of 20.0 mm and a thickness of 0.635 mm in the same manner as in Example 1. For testing the above disk-shaped substrates (not chemically strengthened) for thermal shock resistance, the substrates were heated to 170° C. and poured into, and immersed in, 10 liters of water maintained at a water temperature of 20° C. The substrates were rapidly cooled, and they underwent a breaking.

TABLE 1

| mol % | Glass composition No. 1 | Glass composition No. 2 | Glass composition No. 3 | Glass composition No. 4 | Glass composition No. 5 | Glass composition No. 6 |
|---|---|---|---|---|---|---|
| $SiO_2$ | 64.0 | 64.0 | 64.0 | 64.0 | 64.0 | 64.0 |
| $Al_2O_3$ | 4.0 | 4.0 | 4.0 | 5.0 | 5.0 | 5.0 |
| $ZrO_2$ | 4.0 | 4.0 | 4.0 | 4.0 | 4.0 | 4.0 |
| CaO | 16.0 | 16.0 | 16.0 | 15.0 | 14.0 | 13.0 |
| BaO | 3.0 | 3.0 | 3.0 | 3.0 | 3.0 | 3.0 |
| MgO | 0.0 | 0.0 | 0.0 | 0.0 | 0.0 | 0.0 |
| CaO + BaO + MgO + SrO | 19.0 | 19.0 | 19.0 | 18.0 | 17.0 | 16.0 |
| $Li_2O$ | 1.0 | 2.0 | 2.0 | 2.0 | 2.0 | 2.0 |
| $Na_2O$ | 6.5 | 5.5 | 3.5 | 5.5 | 6.5 | 7.5 |
| $K_2O$ | 1.5 | 1.5 | 3.5 | 1.5 | 1.5 | 1.5 |
| Total | 100.0 | 100.0 | 100.0 | 100.0 | 100.0 | 100.0 |
| Tg(° C.) | 650.0 | 636.0 | 646.0 | 633.0 | 628.0 | 623.0 |

TABLE 1-continued

|  | | | | | | |
|---|---|---|---|---|---|---|
| α (×10⁻⁷/K) | 80.9 | 80.3 | 77.3 | 78.7 | 81.0 | 83.7 |
| Specific gravity | 2.788 | 2.794 | 2.783 | 2.782 | 2.778 | 2.766 |
| Young's modulus (GPa) | 85.75 | 86.87 | 85.61 | 86.90 | 86.51 | 85.61 |
| Specific elastic modulus (GPa) | 30.76 | 31.09 | 30.76 | 31.24 | 31.14 | 30.95 |
| Rigidity (GPa) | 34.61 | 35.06 | 34.54 | 35.08 | 34.96 | 34.61 |
| Poisson's ratio | 0.239 | 0.239 | 0.239 | 0.238 | 0.237 | 0.237 |

| wt % | Glass composition No. 1 | Glass composition No. 2 | Glass composition No. 3 | Glass composition No. 4 | Glass composition No. 5 | Glass composition No. 6 |
|---|---|---|---|---|---|---|
| $SiO_2$ | 57.7 | 58 | 57.4 | 57.4 | 57.4 | 57.4 |
| $Al_2O_3$ | 6.1 | 6.1 | 6.1 | 7.6 | 7.6 | 7.6 |
| $ZrO_2$ | 7.4 | 7.4 | 7.3 | 7.4 | 7.4 | 7.4 |
| CaO | 13.4 | 13.5 | 13.4 | 12.6 | 11.7 | 10.9 |
| BaO | 6.9 | 6.9 | 6.8 | 6.9 | 6.9 | 6.8 |
| MgO | 0 | 0 | 0 | 0 | 0 | 0 |
| $Li_2O$ | 0.4 | 0.9 | 0.9 | 0.9 | 0.9 | 0.9 |
| $Na_2O$ | 6 | 5.1 | 3.2 | 5.1 | 6 | 6.9 |
| $K_2O$ | 2.1 | 2.1 | 4.9 | 2.1 | 2.1 | 2.1 |
| Total | 100.0 | 100.0 | 100.0 | 100.0 | 100.0 | 100.0 |

TABLE 2

| mol % | Glass composition No. 7 | Glass composition No. 8 | Glass composition No. 9 | Glass composition No. 10 | Glass composition No. 11 | Glass composition No. 12 |
|---|---|---|---|---|---|---|
| $SiO_2$ | 64.0 | 64.0 | 64.0 | 64.0 | 64.0 | 64.0 |
| $Al_2O_3$ | 5.0 | 5.0 | 5.0 | 5.0 | 5.0 | 5.0 |
| $ZrO_2$ | 4.0 | 4.0 | 4.0 | 4.0 | 4.0 | 4.0 |
| CaO | 10.0 | 12.5 | 13.0 | 15.0 | 16.0 | 13.5 |
| BaO | 3.0 | 3.0 | 3.0 | 3.0 | 3.0 | 3.0 |
| MgO | 0.0 | 0.0 | 0.0 | 0.0 | 0.0 | 0.0 |
| CaO + BaO + MgO + SrO | 13.0 | 15.5 | 16.0 | 18.0 | 19.0 | 16.5 |
| $Li_2O$ | 5.0 | 5.0 | 5.0 | 4.0 | 4.0 | 4.0 |
| $Na_2O$ | 7.5 | 5.0 | 6.0 | 5.0 | 4.0 | 5.0 |
| $K_2O$ | 1.5 | 1.5 | 0.0 | 0.0 | 0.0 | 1.5 |
| Total + A18 | 100.0 | 100.0 | 100.0 | 100.0 | 100.0 | 100.0 |
| Tg (° C.) | 567.0 | 591.0 | 594.0 | 619.0 | 628.0 | 608.0 |
| α (×10⁻⁷/K) | 86.1 | 81.5 | 79.4 | 76.0 | 70.2 | 79.8 |
| Specific gravity | 2.750 | 2.766 | 2.774 | 2.787 | 2.796 | 2.771 |
| Young's modulus (GPa) | 86.56 | 88.22 | 88.99 | 89.60 | 90.28 | 88.03 |
| Specific elastic modulus (GPa) | 31.48 | 31.89 | 32.08 | 32.15 | 32.29 | 31.77 |
| Rigidity (GPa) | 35.04 | 35.66 | 35.94 | 36.15 | 36.36 | 35.54 |
| Poisson's ratio | 0.235 | 0.237 | 0.238 | 0.239 | 0.241 | 0.238 |

| wt % | Glass composition No. 7 | Glass composition No. 8 | Glass composition No. 9 | Glass composition No. 10 | Glass composition No. 11 | Glass composition No. 12 |
|---|---|---|---|---|---|---|
| $SiO_2$ | 58.2 | 58.2 | 58.6 | 58.4 | 58.4 | 58 |
| $Al_2O_3$ | 7.7 | 7.7 | 7.8 | 7.8 | 7.8 | 7.7 |
| $ZrO_2$ | 7.4 | 7.5 | 7.5 | 7.5 | 7.5 | 7.4 |
| CaO | 8.5 | 10.6 | 11.1 | 12.8 | 13.7 | 11.4 |
| BaO | 6.9 | 6.9 | 7 | 7 | 7 | 6.9 |
| MgO | 0 | 0 | 0 | 0 | 0 | 0 |
| $Li_2O$ | 2.2 | 2.3 | 2.3 | 1.8 | 1.8 | 1.8 |
| $Na_2O$ | 7 | 4.7 | 5.7 | 4.7 | 3.8 | 4.7 |
| $K_2O$ | 2.1 | 2.1 | 0 | 0 | 0 | 2.1 |
| Total | 100.0 | 100.0 | 100.0 | 100.0 | 100.0 | 100.0 |

TABLE 3

| mol % | Glass composition No. 13 | Glass composition No. 14 | Glass composition No. 15 | Comparative glass composition No. 1 | Comparative glass composition No. 2 |
|---|---|---|---|---|---|
| $SiO_2$ | 64.0 | 64.0 | 64.0 | 65.0 | 64.0 |
| $Al_2O_3$ | 5.0 | 5.0 | 5.0 | 5.0 | 4.0 |
| $ZrO_2$ | 4.0 | 4.0 | 4.0 | 4.0 | 4.0 |
| CaO | 14.0 | 13.0 | 15.0 | 13.0 | 16.0 |
| BaO | 3.0 | 3.0 | 3.0 | 3.0 | 3.0 |
| MgO | 0.0 | 0.0 | 2.0 | 0.0 | 0.0 |
| CaO + BaO + MgO + SrO | 17.0 | 16.0 | 20.0 | 16.0 | 19.0 |
| $Li_2O$ | 4.0 | 4.0 | 3.0 | 0.0 | 0.0 |
| $Na_2O$ | 6.0 | 6.0 | 4.0 | 4.0 | 7.5 |
| $K_2O$ | 0.0 | 1.0 | 0.0 | 6.0 | 1.5 |
| Total | 100.0 | 100.0 | 100.0 | 100.0 | 100.0 |
| Tg(° C.) | 608.0 | 598.0 | 628.0 | 665.0 | 670.0 |
| $\alpha$ ($\times 10^{-7}$/K) | 77.3 | 75.1 | 70.3 | 83.0 | 82.0 |
| Specific gravity | 2.782 | 2.771 | 2.792 | 2.740 | 2.791 |
| Young's modulus (GPa) | 88.76 | 87.82 | 91.20 | 79.96 | 84.97 |
| Specific elastic modulus (GPa) | 31.91 | 31.69 | 32.66 | 29.18 | 30.44 |
| Rigidity (GPa) | 35.89 | 35.50 | 36.73 | 32.35 | 34.26 |
| Poisson's ratio | 0.237 | 0.237 | 0.241 | 0.236 | 0.240 |

| wt % | Glass composition No. 13 | Glass composition No. 14 | Glass composition No. 15 | Comparative glass composition No. 1 | Comparative glass composition No. 2 |
|---|---|---|---|---|---|
| $SiO_2$ | 58.5 | 58.2 | 58.5 | 56.5 | 57.4 |
| $Al_2O_3$ | 7.7 | 7.7 | 7.8 | 7.4 | 6.1 |
| $ZrO_2$ | 7.5 | 7.4 | 7.5 | 7.1 | 7.3 |
| CaO | 11.9 | 11 | 12.8 | 10.6 | 13.4 |
| BaO | 7 | 6.9 | 7 | 6.6 | 6.8 |
| MgO | 0 | 0 | 1.2 | 0 | 0 |
| $Li_2O$ | 1.8 | 1.8 | 1.4 | 0 | 0 |
| $Na_2O$ | 5.6 | 5.6 | 3.8 | 3.6 | 6.9 |
| $K_2O$ | 0 | 1.4 | 0 | 8.2 | 2.1 |
| Total | 100.0 | 100.0 | 100.0 | 100.0 | 100.0 |

Example 2

Disk-shaped substrates having an outer diameter of 27.4 mm, a center hole diameter of 7.0 mm and a thickness of 0.381 mm were produced from glasses having the same compositions as the compositions Nos. 1 to 15 in Example 1.

Specifically, each of homogenized molten glasses was fed into a mold and press-molded, and the resultant press-molded product was gradually cooled to obtain a disk-shaped substrate, followed by mechanical processing such as polishing, lapping, and the like. Then, thus-obtained substrates were immersed in a potassium nitrate/sodium nitrate mixture molten salt (potassium nitrate/sodium nitrate weight ratio=3/2) under heat at 450° C. for 4 hours to chemically strengthen them, and the thus-obtained substrates were washed to produce disk-shaped substrates.

The main surface of each of the washed disk-shaped substrates was measured for a centerline average roughness Ra with an atomic force microscope (AFM) to show 0.1 to 0.6 nm.

While the above washing procedure can be carried out with a well-known washing liquid, the alkali elution amount of each glass constituting the substrate was at a very low level, so that the surface roughening of the substrates during the washing were suppressed.

When the thus-obtained glass substrates were subjected to the same thermal shock resistance test as that in Example 1, none of the glass substrates (chemically strengthened) underwent a breaking.

The glass substrates in this Example are suitable as a substrate for a magnetic disk having a nominal diameter of 1 inch, and as a substrate having high heat resistance and high strength, they are suitable as a substrate for a perpendicular magnetic recording disk.

For obtaining the above glass substrates, the above press-molding method may be replaced, for example, with a method in which a thin plate glass is formed by a floating method and the thin plate glass was processed in the form of a disk, to produce a glass substrate.

Example 3

The same glass substrates as those in Examples 1 and 2 were washed and dried, and these glass substrates were used to produce perpendicular magnetic recording disks. With regard to formation of a magnetic recording layer, there were produced two types of perpendicular magnetic recording disks, one perpendicular magnetic recording disk having a bi-layered film in which a soft magnetic layer and a magnetic recording layer were consecutively formed, and the other perpendicular magnetic recording disk having a three-layered film in which a hard magnetic layer, a soft magnetic layer and a magnetic recording layer were consecutively formed. In the above step, the magnetic recording film was treated at a high temperature of 400 to 600° C. (sputtering and annealing). However, all the substrates maintained high flatness without being deformed.

The glass substrate of the present invention has a high glass transition temperature and has excellent thermal shock resistance as described above, so that the glass substrate is suitable for high-temperature treatment employed for improving properties of a magnetic recording medium and is suitable for forming a magnetic film in a high-temperature sputtering machine.

While the above Examples explain the present invention with regard to magnetic recording media as examples, the present invention can also similarly produce excellent results with regard to other information recording media such as optical recording and magneto-optical recording media.

The invention claimed is:

1. A glass substrate for an information recording medium, which is formed of a glass comprising $SiO_2$, $Al_2O_3$, $ZrO_2$, CaO, BaO, $Li_2O$ and $Na_2O$ as essential components and comprising, by mol %,
50 to 70% of $SiO_2$,
1 to 10% of $Al_2O_3$,
over 0% but not more than 12% of $ZrO_2$,
2 to 24% of CaO,
over 0% but not more than 15% of BaO,
0 to 2% of MgO,
0 to 15% of SrO,
provided that the content of CaO+BaO+MgO+SrO is over 10% but less than 25%,
over 0% but not more than 6% of $Li_2O$,
over 0% but not more than 10% of $Na_2O$,
0 to 5% of $K_2O$, and
0 to 10% of $TiO_2$,
wherein the glass has a glass transition temperature of 560° C. or higher.

2. The glass substrate for an information recording medium as recited in claim 1, which has such thermal shock resistance that it does not break when rapidly cooled in a manner in which it is introduced into water maintained at 20° C. from a heating state under heat at 170° C. and immersed in the water.

3. The glass substrate for an information recording medium as recited in claim 1, wherein the glass has an average linear expansion coefficient of $70 \times 10^{-7}$/K or more at 100 to 300° C.

4. The glass substrate for an information recording medium as recited in claim 1, wherein the glass is a chemically strengthened glass.

5. The glass substrate for an information recording medium as recited in claim 1, which is a substrate for an information perpendicular-recording medium.

6. A process for producing a glass substrate for an information recording medium, which comprises the step of shaping a molten glass into a plate-shaped glass, the molten glass containing $SiO_2$, $Al_2O_3$, $ZrO_2$, CaO, BaO, $Li_2O$ and $Na_2O$ as essential components and comprising, by mol %,
50 to 70% of $SiO_2$,
1 to 10% of $Al_2O_3$,
over 0% but not more than 12% of $ZrO_2$,
2 to 24% of CaO,
over 0% but not more than 15% of BaO,
0 to 2% of MgO,
0 to 15% of SrO,
provided that the content of CaO+BaO+MgO+SrO is over 10 but less than 25%,
over 0% but not more than 6% of $Li_2O$,
over 0% but not more than 10% of $Na_2O$,
0 to 5% of $K_2O$, and
0 to 10% of $TiO_2$,
wherein the glass has a glass transition temperature of 560° C. or higher.

7. An information recording medium comprising the glass substrate for an information recording medium recited in claim 1 and at least an information recording layer formed on said glass substrate.

8. A process for producing an information recording medium, which comprises the step of forming an information recording layer on the glass substrate from an information recording medium recited in claim 1.

* * * * *